(12) United States Patent
Shimura

(10) Patent No.: US 7,293,455 B2
(45) Date of Patent: Nov. 13, 2007

(54) SENSOR DEVICE FOR TIRE HAVING DISPLACEABLE ANTENNA

(75) Inventor: Kazuhiro Shimura, Hiratsuka (JP)

(73) Assignee: The Yokohama Rubber Co., Tokyo (JP)

( * ) Notice: Subject to any disclaimer, the term of this patent is extended or adjusted under 35 U.S.C. 154(b) by 0 days.

(21) Appl. No.: 10/544,996

(22) PCT Filed: Mar. 24, 2004

(86) PCT No.: PCT/JP2004/004059

§ 371 (c)(1),
(2), (4) Date: Aug. 10, 2005

(87) PCT Pub. No.: WO2004/087439

PCT Pub. Date: Oct. 14, 2004

(65) Prior Publication Data

US 2006/0144132 A1  Jul. 6, 2006

(30) Foreign Application Priority Data

Mar. 31, 2003  (JP) ............................. 2003-094798

(51) Int. Cl.
*G01M 17/02* (2006.01)
(52) U.S. Cl. ....................................................... 73/146
(58) Field of Classification Search ............... 73/146.2, 73/146.3, 146.4, 146.5, 146.8, 146
See application file for complete search history.

(56) References Cited

U.S. PATENT DOCUMENTS

| 4,389,884 A | 6/1983 | Agulia |
| 4,531,112 A | 7/1985 | Thomas |

FOREIGN PATENT DOCUMENTS

| JP | 49-108091 U | 9/1974 |
| JP | 56-116304 A | 9/1981 |
| JP | 58-132705 U | 9/1983 |
| JP | 10-504783 A | 5/1998 |
| JP | 2004-189148 A | 7/2004 |

OTHER PUBLICATIONS

PCT International Search Report for PCT/JP2004/004059 mailed on Jul. 27, 2004.

*Primary Examiner*—Andre J. Allen
(74) *Attorney, Agent, or Firm*—Greer, Burns & Crain, Ltd

(57) ABSTRACT

A sensor device for a tire, having enhanced transmission capability without disturbing the assembly of a rim to the tire. With itself installed in the tire, the sensor device detects information inside the tire and transmits the result to the outside. The sensor device has a case for receiving an electronic component and an antenna electrically connected to the electronic component and extended to the outside of the case. The fore-end portion of the antenna is made to be displaceable outwardly in the tire radial direction by centrifugal force generated in the rotation of the tire.

4 Claims, 4 Drawing Sheets

SENSOR DEVICE FOR TIRE HAVING DISPLACEABLE ANTENNA

TECHNICAL FIELD

The present invention relates to a sensor device for a tire, which detects information inside the tire such as an internal pressure, and more particularly relates to a sensor device for a tire having enhanced transmission capability without disturbing assembly of a rim to the tire.

BACKGROUND ART

In order to monitor information inside a tire, such as an internal pressure and temperature, there has been heretofore performed attachment of a sensor device to a well part of a rim, detection of the information inside the tire by use of the sensor device, and transmission of the detection results to a receiver outside of the tire by utilizing radio waves.

In such a sensor device for a tire, generally, a sensor and a transmitter are mounted on a printed board, a transmission antenna is printed on the printed board, and these sensor and transmitter are housed in a thin case together with the printed board.

Upon attachment of the sensor device described above to a well part of a rim, assembly of the rim is not disturbed by the sensor device if a bottom of the case is allowed to follow a surface of the well part. However, as described above, most sensor devices include the antenna printed on the printed board. Thus, if the printed board is disposed parallel to the well part, there is a problem that transmission efficiency is extremely deteriorated. Consequently, in the present circumstances, the sensor device is attached so as to allow the printed board to stand against the well part of the rim, and instead, lowered workability of the assembly of the rim is accepted. Moreover, there has been proposed a sensor device in which a transmission antenna is protruded to the outside of a case. However, also in this case, lowered workability of assembly of a rim is inevitable (for example, see Japanese patent application *Kohyo* publication No. Hei 10(1998)-504783).

SUMMARY OF THE INVENTION

It is an object of the present invention to provide a sensor device for a tire, having enhanced transmission capability without disturbing assembly of a rim to the tire.

A sensor device for a tire of the present invention to achieve the foregoing object is a sensor device for a tire, which detects information inside the tire with itself installed in an air chamber of the tire and transmits the result to the outside. The sensor device includes: a case for receiving an electronic component; and an antenna which is electrically connected to the electronic component and extended to the outside of the case. A fore-end portion of the antenna is made to be displaceable outwardly in a tire radial direction by centrifugal force generated in the rotation of the tire.

To be more specific, a sensor device for a tire of the present invention is a sensor device for a tire, which detects information inside the tire with itself installed in an air chamber of the tire and transmits the result to the outside. The sensor device includes: a sensor which detects the information inside the tire; a transmitter which transmits the information inside the tire; a case for receiving electronic components including the sensor and the transmitter; and an antenna which is electrically connected to the electronic components and extended to the outside of the case. A fore-end portion of the antenna is made to be displaceable outwardly in a tire radial direction by centrifugal force generated in the rotation of the tire.

As described above, the antenna is extended to the outside of the case and the fore-end portion of the antenna is made to be displaceable outwardly in the tire radial direction by the centrifugal force generated in the rotation of the tire. Thus, the fore-end portion of the antenna is displaced outwardly in the tire radial direction during running, and excellent transmission capability can be achieved. Moreover, upon attachment of the sensor device to a well part of a rim, for example, the case is disposed approximately parallel to a surface of the well part, and a protruded amount from the surface of the well part is reduced as much as possible. Consequently, assembly of the rim to the tire is not disturbed.

In the present invention, there is an advantage that, even if buckling occurs in a tread center portion of the tire during run-flat running, the sensor device installed in the air chamber of the tire is unlikely to crash against an inner surface of the tire.

In the present invention, as a method for making the fore-end portion of the antenna displaceable, it is preferable that the antenna be formed of a conductive material having flexibility. For example, the antenna can be formed of elastomer filled with conductive fillers or can be formed of a coated wire obtained by subjecting a conductive core wire to insulating coating. In either case, in order to obtain good flexibility, it is preferable that flexural rigidity of an attachment portion of the antenna be 60 $Nmm^2$ or less.

As another method for making the fore-end portion of the antenna displaceable, the antenna can be formed to be swingable by a rotation mechanism or the antenna can be formed to be retractable by a slide mechanism.

It is preferable that a length of the antenna be ½, ¼, ⅛ or 1/16 of a wavelength of electromagnetic waves used for communication. Thus, more excellent transmission capability can be achieved. Moreover, it is preferable that an insulating weight be attached to the fore-end portion of the antenna. Thus, displacement of the fore-end portion of the antenna by the centrifugal force can be facilitated. Furthermore, it is preferable that the antenna be covered with an insulating spacer. Thus, occurrence of radio interference caused by a narrowed gap between the antenna and the rim during stopping can be surely avoided, and more excellent transmission capability can be achieved.

DESCRIPTION OF THE PREFERRED EMBODIMENTS

With reference to the accompanying drawings, a configuration of the present invention will be described in detail below.

Figure 1:
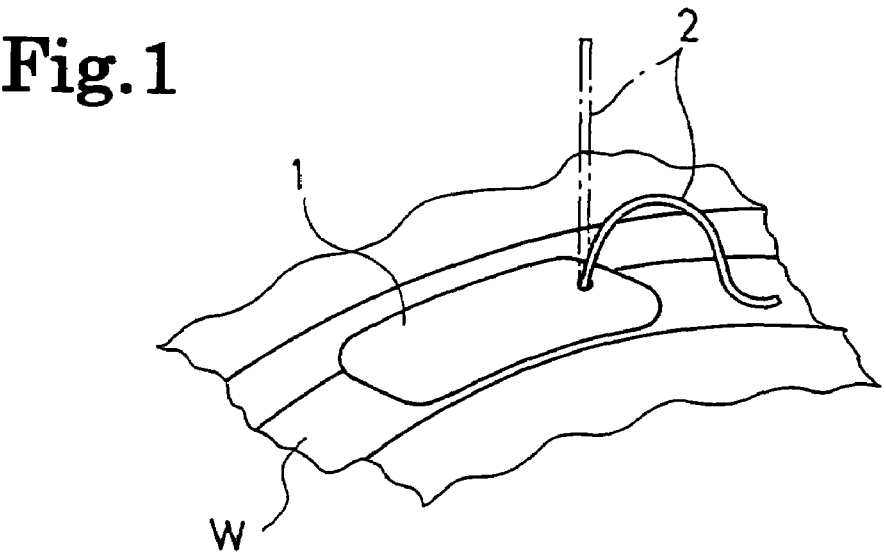
FIG. 1 is a perspective view showing a state where a sensor device for a tire according to a first embodiment of the present invention is attached to a well part of a rim.
Figure 2:
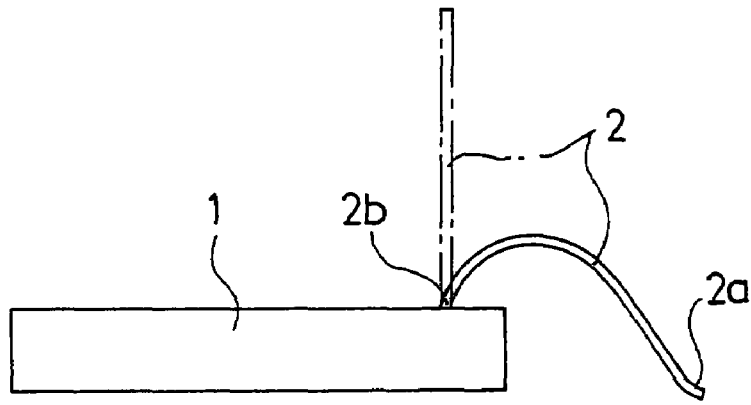
FIG. 2 is a side view showing the sensor device for a tire according to the first embodiment of the present invention.
Figure 3:
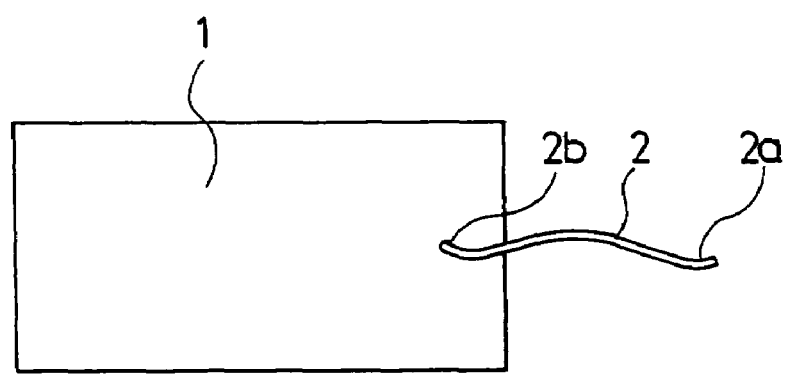
FIG. 3 is a plan view showing the sensor device for a tire according to the first embodiment of the present invention.
Figure 4:
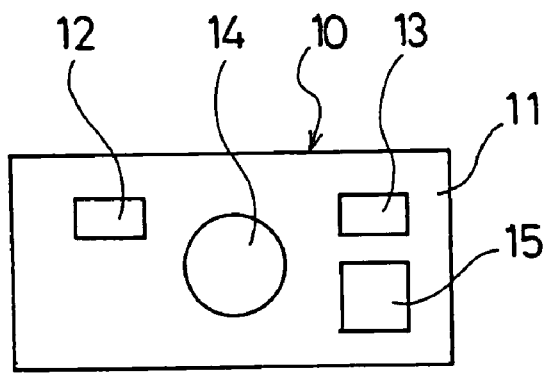
FIG. 4 is a plan view exemplifying a sensor unit according to the present invention.

FIGS. 1 to 3 show a sensor device for a tire according to a first embodiment of the present invention, and FIG. 4 exemplifies a sensor unit. As shown in FIG. 1, the sensor device for a tire of this embodiment detects information inside the tire in a state where the device is installed in a well part W of a rim, for example, in an air chamber of the tire and transmits the result to the outside. As shown in FIGS. 2 and 3, the sensor device for a tire includes a case 1 for receiving electronic components, and an antenna 2 extended to the outside of the case 1.

Inside of the case 1, a sensor unit 10 as shown in FIG. 4 is housed. In this sensor unit 10, electronic components such as a sensor 12, a transmitter 13, a battery 14 and a control circuit 15 are mounted on a printed board 11. As the sensor 12, at least one of a pressure sensor and a temperature sensor can be used. The antenna 2 is electrically connected to an electronic component included in the transmitter 13. Specifically, the sensor unit 10 measures an air pressure of the tire by use of the pressure sensor, measures a temperature inside the tire by use of the temperature sensor, and transmits the results to the outside of the tire through the antenna 2.

The antenna 2 is formed of a conductive material having flexibility. Thus, a fore-end portion 2a of the antenna 2 is displaceable outwardly in a tire radial direction by centrifugal force generated in the rotation of the tire. Accordingly, during running, the antenna 2 stands up outwardly in the tire radial direction, and the fore-end portion 2a thereof is displaced outwardly in the tire radial direction. Thus, excellent transmission capability can be achieved. Moreover, since the antenna 2 has the flexibility, assembly of the rim to the tire is not disturbed if the case 1 is disposed approximately parallel to a surface of the well part. Particularly, if the antenna 2 is made of a conductive material having flexibility, there is also an advantage of a simple antenna structure.

The material of the antenna 2 is not particularly limited. The antenna 2 can be formed of elastomer filled with conductive fillers. For example, one obtained by filling rubber or synthetic resin with carbon black and the like can be used. The antenna can be formed of a coated wire obtained by subjecting a conductive core wire to insulating coating. Here, flexural rigidity of an attachment portion 2b of the antenna 2 to the case 1 is not more than 60 Nmm². If the flexural rigidity of this portion exceeds 60 Nmm², flexibility becomes insufficient. This flexural rigidity is a product EI of a bending modulus E (N/mm²), which is obtained in ASTM D747 test, and a cross-sectional second moment I (mm⁴).

A length of the antenna 2 is ½, ¼, ⅛ or 1/16 of a wavelength of electromagnetic waves used for communication. By setting the antenna 2 to have the length described above, more excellent transmission capability can be achieved.

Figure 5:
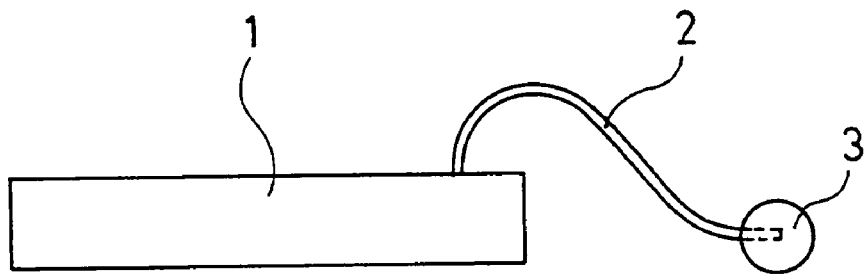
FIG. 5 is a side view showing a modified example of the sensor device for a tire according to the first embodiment of the present invention.

FIG. 5 shows a state where an insulating weight 3 is attached to the fore-end portion 2a of the antenna 2 in the sensor device for a tire according to the first embodiment. As shown in FIG. 5, by attaching the weight 3 to the fore-end portion 2a of the antenna 2, displacement of the fore-end portion 2a of the antenna 2 can be facilitated by centrifugal force acting on the weight 3 in the rotation of the tire. Moreover, since the weight 3 has insulating properties, the antenna 2 and the rim are never electrically connected to each other.

Figure 6:
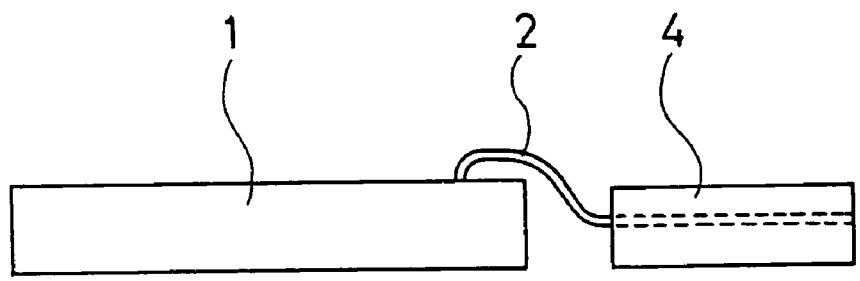
FIG. 6 is a side view showing another modified example of the sensor device for a tire according to the first embodiment of the present invention.

FIG. 6 shows a state where the antenna 2 is covered with an insulating spacer 4 in the sensor device for a tire according to the first embodiment. As shown in FIG. 6, by covering the antenna 2 with the insulating spacer 4, radio interference caused by the rim during stopping is avoided, and more excellent transmission capability can be achieved. As such a spacer, a sponge and the like can be used.

Note that, although the weight 3 and the spacer 4 can be attached to the antenna 2 at the same time, the spacer 4 may be allowed to function as the weight.

Figure 7:
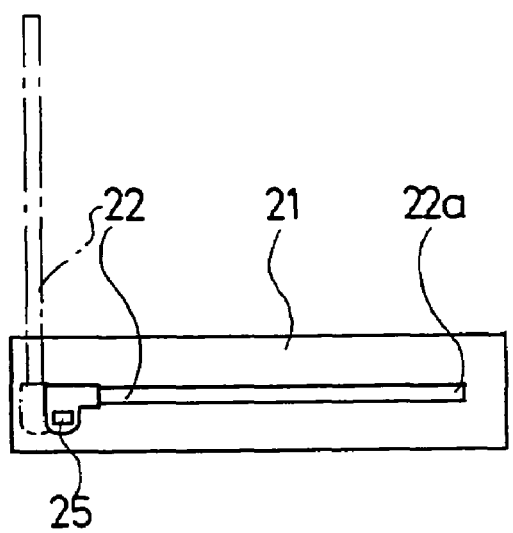
FIG. 7 is a side view showing a sensor device for a tire according to a second embodiment of the present invention.
Figure 8:
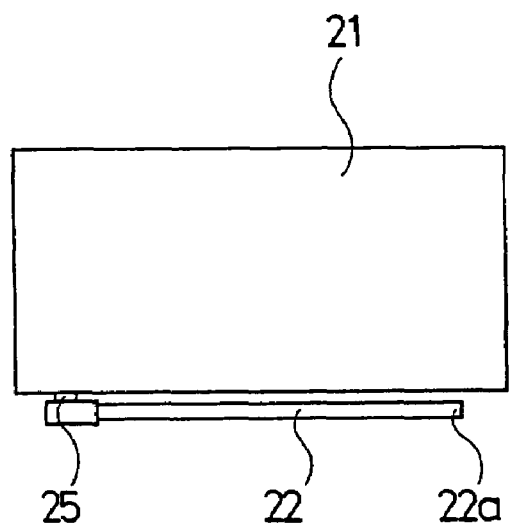
FIG. 8 is a plan view showing the sensor device for a tire according to the second embodiment of the present invention.

FIGS. 7 and 8 show a sensor device for a tire according to a second embodiment of the present invention. The sensor device for a tire of this embodiment detects information inside the tire in a state where the device is installed in an air chamber of the tire and transmits the result to the outside. As shown in FIGS. 7 and 8, the sensor device for a tire includes a case 21 for receiving electronic components, and an antenna 22 extended to the outside of the case 21. A sensor unit similar to that described above is housed in the case 21.

The antenna 22 is formed to be swingable by a rotation mechanism. Specifically, the antenna 22 is supported to be rotatable around a rotation axis 25 extended in a case width direction. Thus, a fore-end portion 22a of the antenna 22 is displaceable outwardly in a tire radial direction by centrifugal force acting on the rotation mechanism in the rotation of the tire. Accordingly, during running, the antenna 22 stands up outwardly in the tire radial direction, and the fore-end portion 22a thereof is displaced outwardly in the tire radial direction. Thus, excellent transmission capability can be achieved. Moreover, assembly of a rim to the tire is not disturbed if the case 21 is disposed approximately parallel to a surface of a well part. Note that the antenna 22 may be energized by a spring or the like so as not to be protruded from the case 21 when there is no centrifugal force generated.

Figure 9:
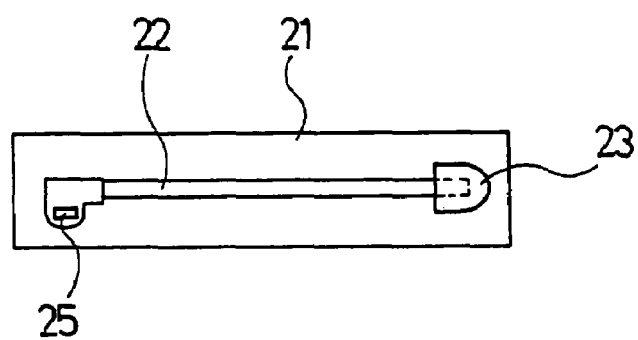
FIG. 9 is a side view showing a modified example of the sensor device for a tire according to the second embodiment of the present invention.

FIG. 9 shows a state where an insulating weight 23 is attached to the fore-end portion 22a of the antenna 22 in the sensor device for a tire according to the second embodiment. As shown in FIG. 9, by attaching the weight 23 to the fore-end portion 22a of the antenna 22, displacement of the fore-end portion 22a of the antenna 22 can be facilitated by centrifugal force acting on the weight 23 in the rotation of the tire. Moreover, since the weight 23 has insulating properties, the antenna 22 and the rim are never electrically connected to each other.

Figure 10:
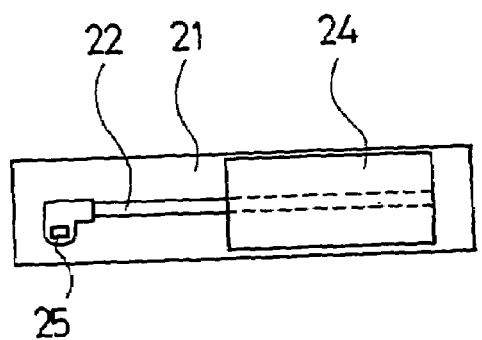
FIG. 10 is a side view showing another modified example of the sensor device for a tire according to the second embodiment of the present invention.

FIG. 10 shows a state where the antenna 22 is covered with an insulating spacer 24 in the sensor device for a tire according to the second embodiment. As shown in FIG. 10, by covering the antenna 22 with the insulating spacer 24, radio interference caused by the rim during stopping is avoided, and more excellent transmission capability can be achieved.

Figure 11:
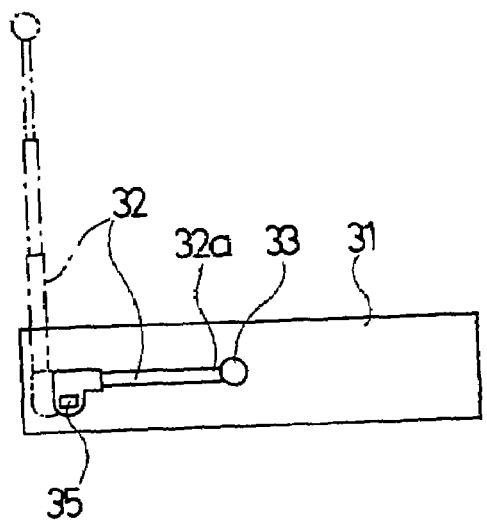
FIG. 11 is a side view showing a sensor device for a tire according to a third embodiment of the present invention.
Figure 12:
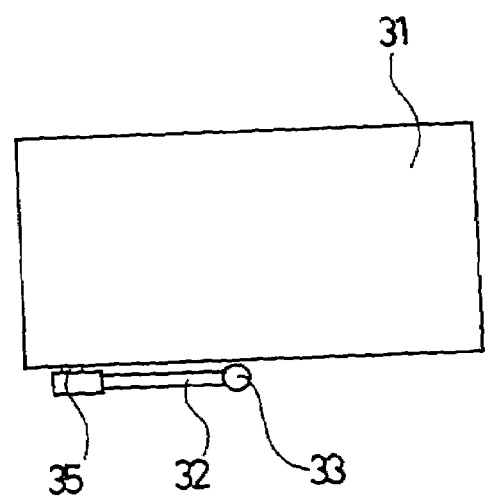
FIG. 12 is a plan view showing the sensor device for a tire according to the third embodiment of the present invention.

FIGS. 11 and 12 show a sensor device for a tire according to a third embodiment of the present invention. The sensor device for a tire of this embodiment detects information inside the tire in a state where the device is installed in an air chamber of the tire and transmits the result to the outside. As shown in FIGS. 11 and 12, the sensor device for a tire includes a case 31 for receiving electronic components, and an antenna 32 extended to the outside of the case 31. A sensor unit similar to that described above is housed in the case 31.

The antenna 32 is formed to be swingable by a rotation mechanism and to be retractable by a slide mechanism. Specifically, the antenna 32 is supported to be rotatable around a rotation axis 35 extended in a case width direction. Moreover, the antenna 32 is formed of a plurality of pipes stacked to be slidable, and its maximum elongation is controlled. Thus, a fore-end portion 32a of the antenna 32 is displaceable outwardly in a tire radial direction by centrifugal force acting on the rotation mechanism and the slide mechanism in the rotation of the tire. Accordingly, during running, the antenna 32 stands up outwardly in the tire radial direction, and the fore-end portion 32a thereof is displaced outwardly in the tire radial direction. Thus, excellent transmission capability can be achieved. Moreover, assembly of a rim to the tire is not disturbed if the case 31 is disposed approximately parallel to a surface of a well part. Note that the antenna 32 may be energized by a spring or the like so as not to be protruded from the case 31 when there is no centrifugal force generated.

In FIGS. 11 and 12, an insulating weight 33 is attached to the fore-end portion 32a of the antenna 32. As described above, by attaching the weight 33 to the fore-end portion 32a of the antenna 32, displacement of the fore-end portion 32a of the antenna 32 can be facilitated by centrifugal force acting on the weight 33 in the rotation of the tire. Moreover, since the weight 33 has insulating properties, the antenna 32 and the well part are never electrically connected to each other.

Although the embodiments of the present invention have been described in detail above, it should be understood that various changes, alternatives, and substitutions can be made without departing from the spirit and scope of the present invention, which are defined by the attached claims.

INDUSTRIAL APPLICABILITY

The present invention can be effectively utilized in tire manufacturing industries and thus in automobile manufacturing industries.

What is claimed is:

1. A sensor device for a tire, which detects information inside the tire with itself installed in an air chamber of the tire and transmits the result to the outside, comprising:
   a case for receiving an electronic component; and
   an antenna which is electrically connected to the electronic component and extended to the outside of the case, the case being between a rim and an attachment portion of the antenna,
   wherein a fore-end portion of the antenna is made to be displaceable outwardly in a tire radial direction by centrifugal force generated in the rotation of the tire, and
   flexural rigidity of the attachment portion of the antenna is not more than 60 Nmm$^2$.

2. The sensor device for a tire according to claim 1, wherein a length of the antenna is any of ½, ¼, ⅛ and ¹⁄₁₆ of a wavelength of electromagnetic waves used for communication.

3. The sensor device for a tire according to claim 1, wherein an insulating weight is attached to the fore-end portion of the antenna.

4. The sensor device for a tire according to claim 1, wherein the antenna is covered with an insulating spacer.

* * * * *